Feb. 14, 1939.  L. A. CORNELIUS  2,147,332

VALVE STRUCTURE

Filed Feb. 2, 1938

INVENTOR.
Louis A. Cornelius
BY
Rice and Rice
ATTORNEYS.

Witness:
John S. Braddock

Patented Feb. 14, 1939

2,147,332

UNITED STATES PATENT OFFICE 2,147,332

VALVE STRUCTURE

Louis A. Cornelius, Grand Rapids, Mich., assignor to Wolverine Brass Works, Grand Rapids, Mich., a corporation of Michigan Application February 2, 1938, Serial No. 188,215

1 Claim. (Cl. 251—27)

The present invention relates to valve structures; and its object is, generally, to provide such a structure which shall be leak-proof although lacking packing, such as the compressible washers and the like usually employed for this purpose.

This and any other and more specific objects hereinafter appearing are attained by, and the invention finds preferable embodiment in, the illustrative valve structure particularly described in the body of this specification and illustrated by the accompanying drawing, in which.

Figure 1:
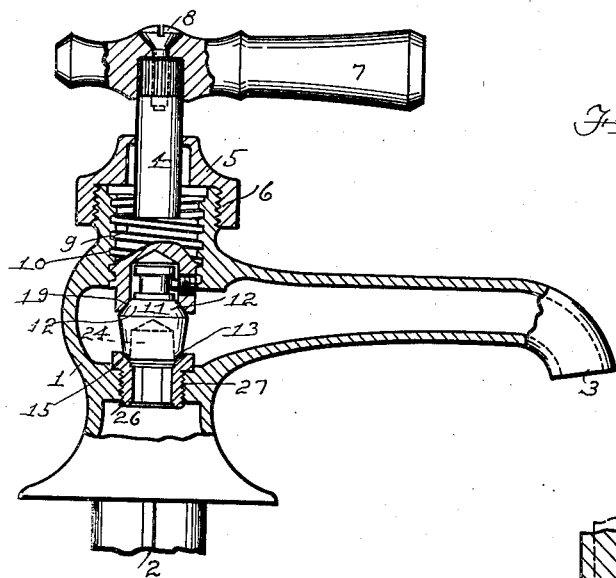
Figure 1 is a side view of a valve structure—a wash basin faucet—embodying my invention, shown partly in central vertical section.

In this embodiment of the invention, the illustrated faucet has the hollow body 1, of brass or the like, with a fluid inlet 2 through its bottom and an outlet 3 through its side.

The valve is operated by any suitable means, such means as shown comprising the rotatable spindle 4 extending through the cap 5 threaded at 6 on the faucet's body, and having a handle 7 secured in adjusted turned position on the spindle by the screw 8, this spindle having a lower end portion 9 threaded at 10 in said body.

Figure 2:
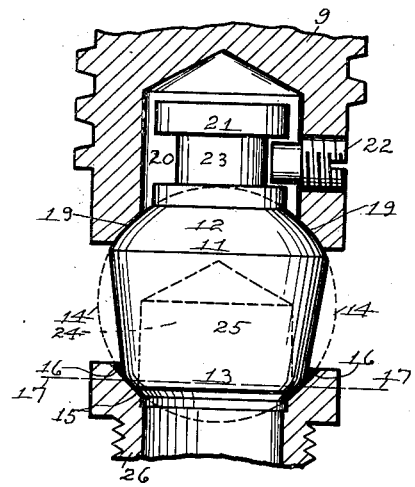
Figure 2 is a side view (enlarged) of the valve member and a central vertical sectional view of portions of the valve seat member and of the valve operating means of the structure.

The valve 11 has opposite upper and lower end portions 12, 13 of convex and concentrically spherical form, the broken circular line 14 in Figure 2 illustrating the circumference of a sphere which would include said end portions of the valve. The valve seat 15 is hollow, concave and cross-sectionally round and receives the lower end portion 13 of the valve in its operative position to seal the inlet 2.

Figure 3:
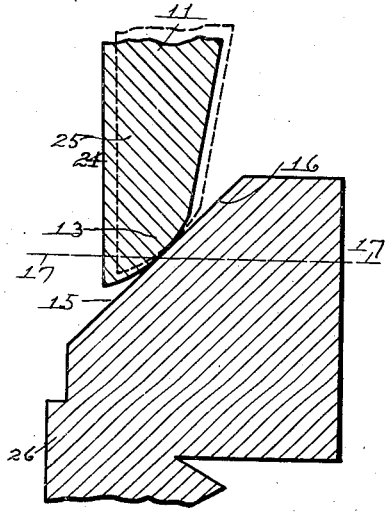
Figure 3 is a radial sectional view (much further enlarged) of portions of the valve member and valve seat member.

In radial cross-section, the upwardly-outwardly inclined sides 16 of the valve seat flare relatively to the convex lower end portion 13 of the valve in its seated position, as particularly well seen in Figures 2 and 3; that is, when the valve is in its seated position, the valve seat's sides 16 and the spherical surface of the valve's lower end portion diverge upwardly and downwardly from the plane (indicated by the broken line 17 in Figures 2 and 3) in which lies the circular line of mutually sealing contact of these parts, thus providing a tightly closed inlet 2 of the structure when the valve is thus seated.

The lower end portion 9 of the spindle 4 has a concave spherical bearing 19 concentric with and receiving the convex upper end portion 12 of the valve which may turn therein universally, i. e. in the manner in which the ball may turn in any direction in the socket of a ball and socket universal joint; and said lower end portion of the spindle has a recess 20 extending upwardly from the bearing 19 and receiving the valve's upwardly projecting member 21 loosely or spacedly, so that this member may have a limited lateral movement in this recess.

Suitable means are provided for retracting the valve from seated position by raising the spindle, such means as shown being a screw 22 threaded in the spindle and extending into the valve's annular groove 23.

The lower end portion of the valve is slightly compressible laterally or diametrically. To this effect, it is desirably somewhat flexible and elastic, and as shown is hollow having a recess 24 extending upwardly from its lower extremity thus providing the valve's laterally slightly compressible side walls 25. As the valve is pressed by its operating means toward fully seated position its lower end portion is slid along the valve seat's inclined sides 16 so as to diametrically and very slightly compress its bottom from the position shown in broken lines to the position shown in solid lines in Figure 3, these relative positions being exaggerated for clearness in this view.

The concave valve seat 15 is formed on the upper end of the hollow valve seat member 26 which is threaded at 27 in the body.

The valve and the valve seat should be made of metal which is resistant to corrosion, such as special stainless steel or Monel and these parts are to be accurately ground or machined to the required shape and dimensions and are to be hardened to 300 degrees Brinell or harder.

It will be seen that inasmuch as the valve's opposite end portions are concentrically spherical, the valve may under the seating action of its operating means be turned somewhat from a vertically axial position and will nevertheless properly bear on the valve seat and also on the spindle; and that, in any position of the valve although held on the valve seat against movement, the rotary spindle may turn freely on the valve's upper end so that any rotary movement of the spindle after the valve is seated cannot turn the valve on its seat and thus wear or abrade said sealingly contacting parts, the only action of the operating means being to move the valve axially into or out of its seating position.

It will also be seen that the valve and the valve seat member may be readily inserted into the body 1 and removed therefrom when the cap 5 is removed.

The invention being intended to be pointed out in the claim, is not to be limited to or by details of construction and arrangement of the particular embodiment thereof illustrated by the drawing or hereinbefore described.

I claim:

A valve structure comprising: a body having a valve chamber with an opening thereinto through which the hereinafter mentioned valve may be inserted into the chamber and withdrawn therefrom, the body having also an opening axially aligned with the first mentioned opening; a valve having concentrically spherical opposite end portions, one of said portions being hollow with laterally compressible side walls and the other end portion having a projecting member provided with an annular groove; a hollow cylindrical valve seat member threaded in the second mentioned opening and having a conically concave valve seat adapted to receive the hollow end portion of the valve in relative universally turning relation sealingly therein; valve operating means threaded in the first mentioned opening having a concave spherical bearing concentric with and receiving the valve's other end portion universally turnable therein, and having also an axially extending recess receiving the valve's projecting member spacedly therefrom for permitting a limited lateral movement thereof therein, said means having also threaded means extending into said groove for connecting the valve detachably with said means in universally turnable and limited laterally movable relation.

LOUIS A. CORNELIUS.